Dec. 6, 1966   W. B. DELAMATER   3,289,875
SEWER PIPE PLUG
Filed July 28, 1965
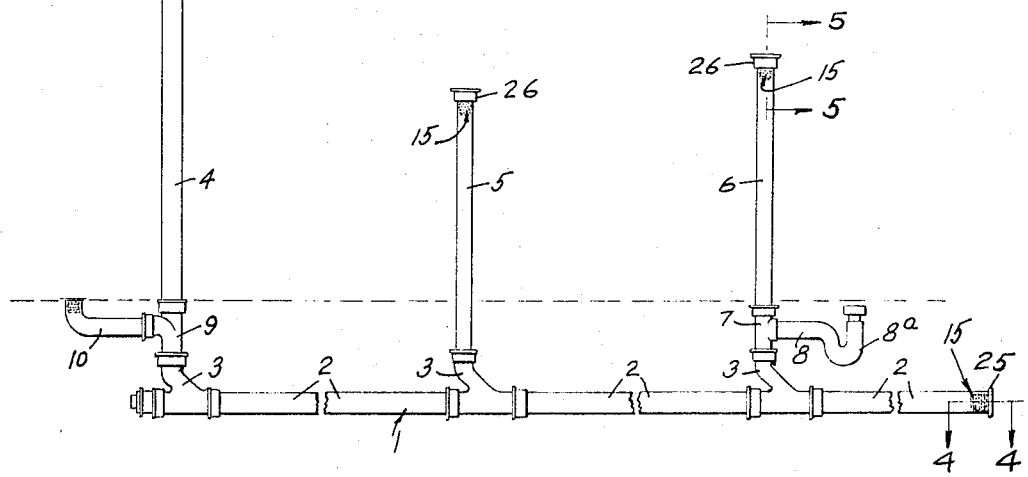
Fig. 1.
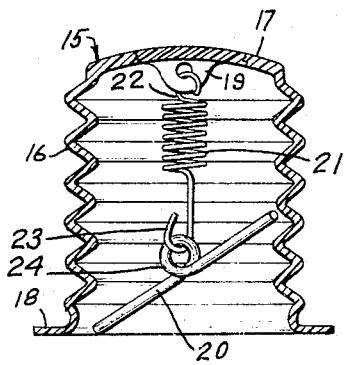
Fig. 2.
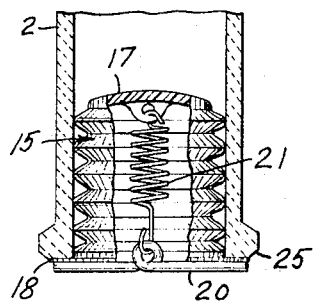
Fig. 4.
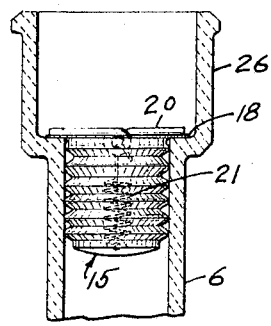
Fig. 5.
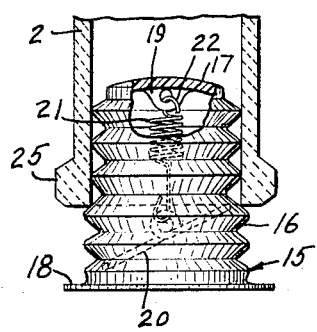
Fig. 3.
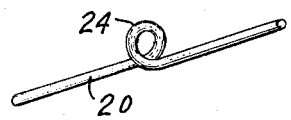
Fig. 6.
INVENTOR.
WILLIAM B. DELAMATER
BY
*Calvin Brown*,
ATTORNEY

United States Patent Office 3,289,875
Patented Dec. 6, 1966

3,289,875
SEWER PIPE PLUG
William B. Delamater, 9114 Valley View, Whittier, Calif.
Filed July 28, 1965, Ser. No. 475,426
2 Claims. (Cl. 220—24.5)

The present invention relates to a plug for use in the testing of fluid systems.

At the present time, it is customary after the plumbing system has been installed within a building, dwelling, or elsewhere, to test the plumbing system for fluid leakage.

To accomplish this, it has been the practice for plumbers to mix cement with casting plaster and water thus forming a thick paste which, when placed in the various open pipe ends of the plumbing system, hardens and plugs the open ends so as to form a closed system which will hold water. The system is then filled with water and an inspection of all the fittings and joints is then made and any leakage which may be present is repaired. As the building of the structure progresses, this mixture of cement and casting plaster is removed for the purpose of installing the fixtures and making the final connection to the sewer system. The removal of the hardened cement and plaster plugs is accomplished by means of a hammer and chisel which is time consuming, difficult, and a costly operation.

It is evident that the mixing of cement and casting plaster for plugging different branch pipes and soil pipes requires a careful mixing and time and expense as the cement and casting plaster must harden prior to making tests. As plumbers charge from ten to fifteen dollars an hour, the expense becomes quite an item.

An object of the present invention is to provide a plug for pipes which is inexpensive in cost of manufacture, may be easily installed in a soil and waste pipe and which after use may be discarded.

I am aware that various plugs have been used for soil and waste pipes, but in every instance, so far as the inventor is aware, said plugs are expensive in cost and as a rule are not thrown away after use thereof.

A further object of my invention is to provide a plug for soil and waste pipes which will conform to an irregular surface, may be hand fitted within the pipe, which does not require any preparation of the pipe to receive the plug, and which may be easily removed from the pipe and discarded after a pressure testing for leak in the fluid systems.

Another object is the provision of a closure plug for pressure testing of fluid systems which will fit various diameters of pipe and which will effectively hold water within soil and waste pipes.

Other objects and advantages will readily suggest themselves to those skilled in this art.

In the drawing:

FIGURE 1 illustrates soil and waste pipes in a plumbing system using plugs of the present invention for the purpose of testing the plumbing system for fluid leakage;

FIGURE 2 is a vertical sectional view on an enlarged scale of a plug embodying the invention;

FIGURE 3 is a fragmentary, partially sectional view, on a reduced scale, illustrating the insertion of the plug within a soil or waste pipe;

FIGURE 4 is a fragmentary, enlarged, partially sectional view of the plug taken on the line 4—4 of FIGURE 1;

FIGURE 5 is a fragmentary sectional view, on an enlarged scale, taken on the line 5—5 of FIGURE 1; and FIGURE 6 is a perspective view of a bridging arm used in the practice of the invention.

Referring now to the drawing, and specifically to FIGURE 1, I have shown a system of riser pipes which connect to a soil pipe 1 made up of interconnected sections 2, the sections 2 interconnected by means of Y and ⅛ bend fittings designated generally as 3, which fittings 3 in turn connect with riser pipes shown at 4, 5, and 6. In the case of the riser pipe 6, and for illustration only, a T joint is provided at 7 which connects with an arm 8 leading to a trap 8a. The T joint shown at 9 interconnects a Y fitting 3 with a drain pipe 10. After the piping has been installed in a structure with the pipes or branches connected to different fixtures such as a sink, a toilet, lavatory, etc., it is necessary that all of the pipes be tested for fluid leak in the plumbing system. Usually, the testing will last for thirty days and in order to make the test it is essential that the soil and waste pipe 1 be closed and the branch pipes likewise closed so that when water is placed in, say, the pipe 4 to fill all of the connected pipes of the system, any leakage at the fittings, joints, and the branches can be readily found and corrected. To accomplish this, I utilize the plug of the character shown in FIGURES 2 to 5 inclusive.

The plug is designated generally as 15 and is formed from a resilient material such as a synthetic rubber or plastic having a curved side wall 16 of corrugated form and with one end 17 closed, the opposite end being open and provided with an outwardly extended annular flange 18. The closed end or top 17 is provided internally with a depending, centrally perforated lug 19. An arm 20 having a length sufficient to span the flange 18 is secured to a coiled spring 21 which spring at one end is secured to the lug 19. Thus the coil spring 21 is centrally positioned within the plug and one end 22 thereof is hooked through the perforation of lug 19. An extension from the opposite end of the coil spring terminates in a hook 23 which engages loop 24 intermediate the length of the arm 20.

In practice, the major diameter of the corrugated side wall of the plug is slightly greater than the internal diameter of the pipe within which the plug is to be inserted. Thus, in FIGURE 3, the arm 20 is hanging loosely within the plug while the plug is being moved within an end of one of the riser pipes 4, 5, 6, or in the soil pipe 2. Due to the corrugations, the plug will extend sightly and reduce the major diameter of the plug and permit insertion of the plug within the pipe. After insertion in the pipe, or before said insertion, the arm 20 may be tipped along the axis of the plug as shown both in FIGURES 2 and 3, whereupon when the flange 18 engages the spigot end 25, as in FIGURE 4, the arm may be withdrawn from the interior of the plug to transversely span the flange 18. This position of the arm 20 expands the corrugations of the plug for tight fit engagement within the pipe, and tensions the spring 21 to maintain plug fit.

In FIGURE 5 I have shown the plug engaging the interior of a pipe of the type which has a hub end 26. Plugs of different diameter may be formed to fit 2", 3", and 4" diameter pipes. The plugs are, in each instance, hand fit and the interior of the pipe does not require any lubrication in order to receive the plug. In actual practice, the plugs are approximately three inches in length. As previously stated, the plugs may be molded from a plastic such as a polyethylene or a vinyl of some type. It is essential, however, that the plugs should be pliable and elastic so as to conform to any irregular surface.

The operation, uses and advantages of my invention are as follows.

Preferably the major diameter of the corrugated surfaces of the plug are approximately ⅟₃₂" greater than the internal diameter of the pipe within which it is to be fitted. When the plug is being hand fitted within a pipe the corrugations of the plug allow expansion thereof and a reduction of external diameter so that the plug will fit easily within the pipe. Upon releasing expansive pressure from the plug, the plug, due to its resiliency, will engage the pipe and will be held in engagement therewith by the arm 20. Tension of spring 21 moves the head 17 to expand the corrugated surface, particularly when the arm 20 bridges the flange 18 as shown in FIGURE 4. The head 17 is preferably so formed as to be thicker than the corrugated side wall of the plug and in the case of rubber, a shore hardness of 70 has been employed. Also, the annular corrugations may be comparatively shallow such as corrugations which have a quarter inch radius between crest and groove. I have found that the present plug may be manufactured for approximately ten cents on the present market and sold at retail prise of twenty-five cents. Therefore, this plug may be thrown away. It goes without saying that the plug should be stiff enough to be form retaining.

It may be pointed out that the average sewer pipe is formed of cast iron and which pipe is usually dipped in hot tar which coats the interior and exterior of the pipe. As a consequence, either the spigot or hub end of the pipe has a rough interior surface which aids in maintaining the plug of the present invention within the same.

I claim:

1. A sewer pipe plug adapted to be received within the end of sewer pipe for plugging said sewer pipe to test for fluid leakage in the pipe, including: an annular side wall of expansible material adapted when expanded to be received within an end of the sewer pipe, said side wall having one end capped, the opposite end being open, a flange extending outwardly from the open end of the side wall for limiting inward movement of the side wall within the sewer pipe, a coil spring within the side wall secured at one end to the cap and a bridging piece secured to the spring and adapted to be positioned diametrically of the flange and to expand the spring to move the side wall into tight engagement with the interior of the sewer pipe.

2. A sewer pipe plug, including: a curved side wall of corrugated form to permit expansion and contraction thereof, said side wall having a closed end and an open end, the side wall at the open end provided with a surrounding flange, the corrugated side wall when unexpanded being of greater diameter than the internal diameter of the sewer pipe end for said plug, the side wall when expanded permitting reception thereof within the pipe end, said flange adapted to engage the end of the pipe for limiting inward movement of the side wall within the pipe, and means for contracting the corrugations of the side wall to expand the wall into tight engagement with the interior surface of the sewer pipe, said means comprising a spring one end of which is secured to the closed end and a bridging piece secured to said spring and adapted to expand said spring when the bridging piece lies diametrically of the flange.

References Cited by the Examiner

UNITED STATES PATENTS 3,098,575   7/1963   Siebelt _____ 215—52

THERON E. CONDON, *Primary Examiner.*

JAMES B. MARBERT, *Examiner.*